April 3, 1956 A. J. BACHELDER ET AL 2,740,714
PHOTOGRAPHIC FILM ASSEMBLY
Filed June 19, 1951 3 Sheets-Sheet 1

INVENTORS
Albert J. Bachelder
William J. McCune, Jr.
BY Brown and Mikulka
and
Moncure B. Berg
ATTORNEYS April 3, 1956  A. J. BACHELDER ET AL  2,740,714
PHOTOGRAPHIC FILM ASSEMBLY
Filed June 19, 1951  3 Sheets-Sheet 2
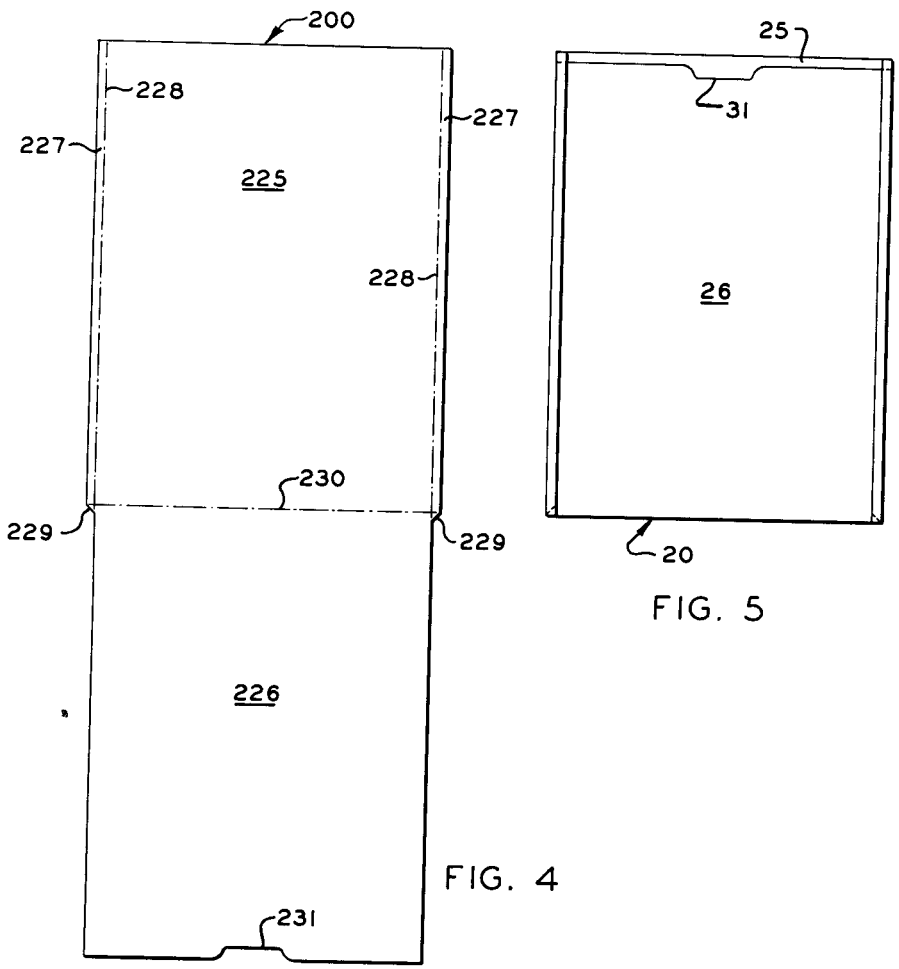
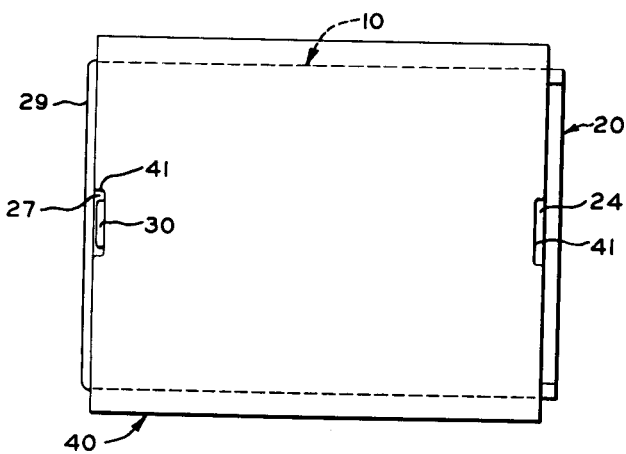

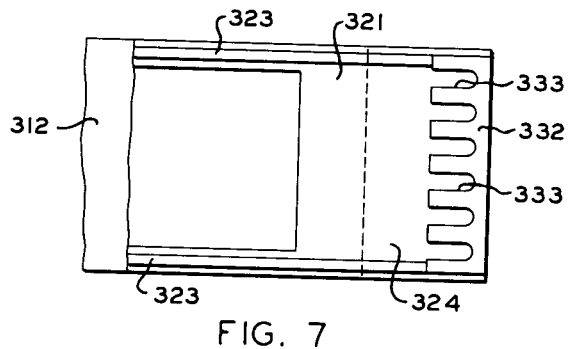
FIG. 7
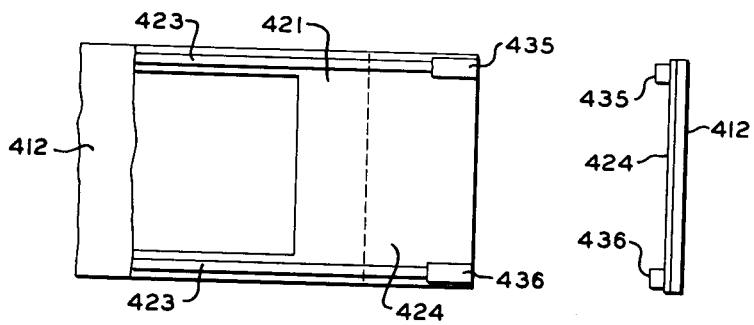
FIG. 8  FIG. 9
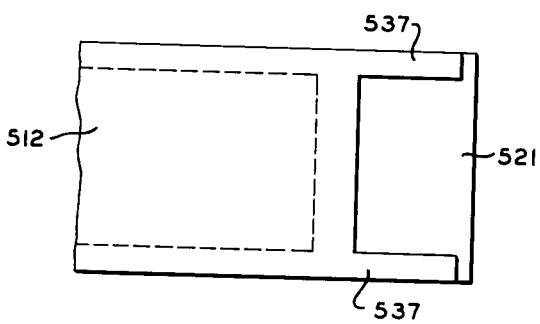
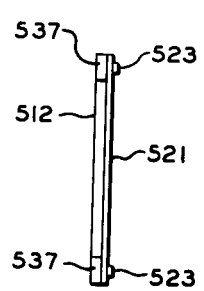
FIG. 10  FIG. 11

United States Patent Office 2,740,714
Patented Apr. 3, 1956

2,740,714
PHOTOGRAPHIC FILM ASSEMBLY

Albert J. Bachelder, Lexington, and William J. McCune, Jr., South Lincoln, Mass., assignors to Polaroid Corporation, Cambridge, Mass., a corporation of Delaware Application June 19, 1951, Serial No. 232,284

19 Claims. (Cl. 95—8)

This invention relates to photography and more particularly is concerned with a photosentive film assembly of the self-developing type having removable means for protecting the film assembly from premature exposure.

Objects of the invention are to provide a photosensitive film assembly wherein two liquid-confining layers are mountable in superposed relation and wherein a photosensitive portion on one of the said layers is protected from exposure to visible and near visible light by envelope means removably encased around said photosensitive portion, and especially a photosensitive film assembly containing material for processing an image formed in the assembly and having a rupturable container holding a liquid processing composition mounted for positioning between said layers; and to provide a photosensitive film assembly wherein a first liquid-confining layer, including a photosensitive portion, and a second liquid-confining layer are hingedly connected at one end with a rupturable container mounted therebetween, and wherein an envelope, substantially opaque to visible and near the visible light, encases the layer having said photosensitive portion and is detachably secured to the other layer.

Other objects of the invention are to provide a photosensitive film assembly of the character described wherein an extension of a wall member of said envelope is adapted to be wrapped or folded around said liquid-confining layers at one of the ends thereof to provide means for securing the envelope in encasing relation to the first liquid-confining layer, and wherein means in the form of a severing string is engaged around said extension portion for disconnecting the envelope from said film assembly whereby the envelope is withdrawable from the first liquid-confining layer; to provide leader means for hingedly connecting said liquid-confining layers together at one end and which are also usable to assist in processing said film assembly; to provide means in the form of a handling tab fixed to the second of said liquid-confining layers to assist in the handling of said film assembly; to provide means for hingedly supporting said container between said liquid-confining layers; and to provide a special type of light-tight envelope and a blank from which said envelope is formed.

Further objects of the invention are to provide a photosensitive film assembly having, in combination, a first liquid-confining layer, including a photosensitive portion thereon, a second liquid-confining layer, a rupturable container adapted to be mounted between said layers, means which hingedly connect said layers together at one end and also serve to assist in the processing of said photosensitive film assembly, means for handling said film assembly in the form of a tab member fixed to the second liquid-confining layer, a flexible sheet material in the form of a mask strippably adhered to the inner surface of the second liquid-confining layer and provided with means in the form of an extension which extends said mask beyond the second liquid-confining layer for trapping and collecting excess liquid composition employed during film processing, and means on said second liquid-confining layer for assisting in stripping said layer from said film assembly upon completion of film processing; and to provide a photosensitive film assembly of the character set forth which is provided with removable and substantially light-tight envelope means encasing a photosensitive portion of said film assembly whereby the film assembly may be handled in daylight and under other illuminated conditions for mounting within a holder or cassette.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 4 is a plan view of a blank for forming an envelope associated with the film assemblies of the invention;

Fig. 5 is a plan view of an envelope formed from the blank of Fig. 4;

Fig. 6 is a diagrammatic perspective view of a film holder or X-ray cassette with which the film assemblies of the invention are usable;

Fig. 7 is a partial plan view of another embodiment of a print-receiving element viewed from the innermost or image-receiving surface thereof;

Fig. 8 is a partial plan view of still another embodiment of a print-receiving element viewed from the innermost or image-receiving surface thereof;

Fig. 9 is an end view of the print-receiving element of Fig. 8;

Fig. 10 is a partial plan view of a still further embodiment of print-receiving element viewed from the outermost surface thereof; and Fig. 11 is an end view of the print-receiving element of Fig. 10.

Figure 1:
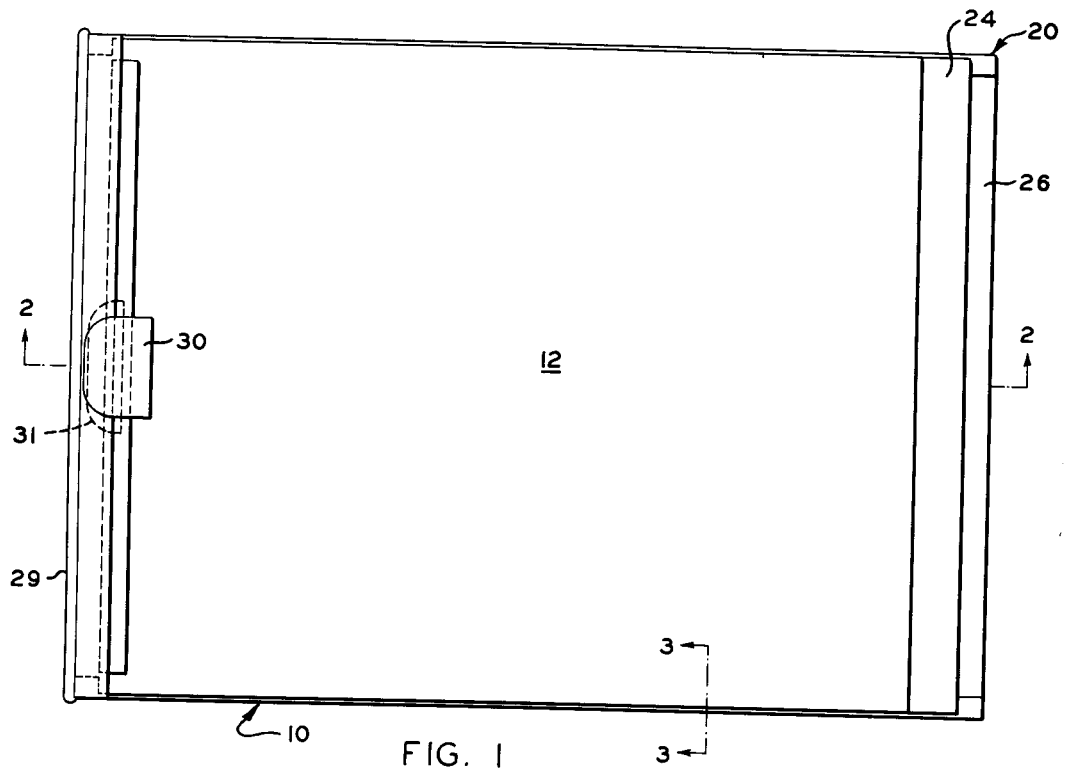
Figure 1 is a plan view of a photosensitive film assembly of this invention showing the print-carrying element uppermost.
Figure 2:
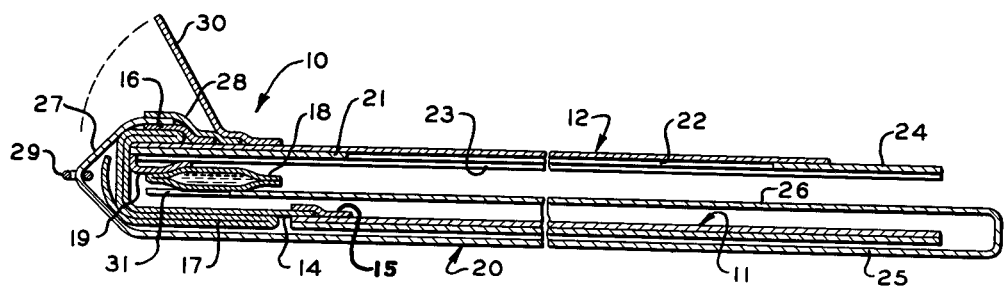
Fig. 2 is a diagrammatic, longitudinal, sectional view of the film assembly of Fig. 1 taken on the line 2—2 thereof.
Figure 3:
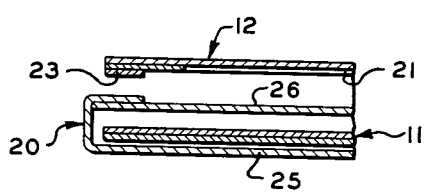
Fig. 3 is a partial transverse sectional view of the photosensitive film assembly of Fig. 1 taken on the line 3—3 thereof.

With reference to the drawings, wherein like parts are designated by similar reference numerals throughout the different views, there is illustrated in Figs. 1 through 3 a preferred embodiment of photosensitive film assembly of the self-developing type which is capable of use in carrying out a photographic transfer process and which is designated generally by the reference numeral 10.

Film assembly 10 comprises a pair of liquid-confining layers 11 and 12 which are hinged together at one end whereby they may be arranged in superposed or overlying relation or may be spread apart with respect to each other. The liquid-confining layer 11 includes a photosensitive area or portion over at least a part of the surface thereof which is adapted to be arranged in overlying relation to the layer 12 whereby the layer 11 constitutes a photosensitive negative layer or element. A preferred photosensitive material for carrying out a photographic transfer process, as well as a material which is ideally suited for X-ray photography, is illustrated as comprising a conventional base coated with a silver halide emulsion. The liquid-confining layer 12 includes a print-receiving area for receiving an image by transfer on at least a part of the surface thereof adapted to be arranged in overlying relation with respect to layer 11. A conventional photographic insensitive paper such as baryta paper is an example of a material which forms the layer 12, including the print-carrying area thereof. Layer 12 constitutes in effect a print-receiving layer or positive element for a transfer image.

Means for hinging the layers 11 and 12 together employs a leader 14 in the form of a strip of flexible or pliable material such as paper or the like. The material for the leader 14 should also be a material which is substantially opaque to visible and near visible light. Appropriate film leader stock is suitable for this purpose. As illustrated, liquid-confining or positive layer 12 may be longer than the photosensitive or negative layer 11. Layers 11 and 12 are arranged so that the positive layer 12 extends beyond the negative layer 11 at one end of the film assembly. Leader 14 has one of its ends lapped over the inner surface of liquid-confining layer 11 at the end of layer 11 which is overhung by the layer 12 and is secured thereto by means of an adhesive strip or tape 15. From the negative layer 11, leader 14 extends around or over the overhanging end of positive layer 12 and over the outer surface of layer 12 for a short distance where it is doubled over upon itself and secured to the layer 12 by means of an adhesive strip or tape 16.

Adhesive strips 15 and 16 are both of a length approximately equal to the width of the liquid-confining layer with which they are respectively associated and extend transversely of the layers 11 and 12. Similarly, leader 14 between the connecting strips 15 and 16 has a width approximately equal to the width of layers 11 or 12 and is positioned transversely of said layers. The portion of leader 14 between the positions of connection to the liquid-confining layers provides hinge means which permit pivotal movement of layers 11 and 12 relative to each other at one end of the film assembly whereby the layers may be spread apart or brought into contact or positioned in spaced and generally parallel relation to each other.

The connection of leader 14 to the positive or print-receiving layer 12 occurs at a location between the ends of the leader. It is to be observed that leader 14 has an end connected to negative layer 11 and an unconnected or free end. The portion 17 of the leader which lies between the connection 16 and the free end of the leader is a relatively elongated portion and provides means adapted to assist in the processing of the film assembly. Leader portion 17 is of a sufficient length so that it may be folded or extended around the ends of layers 12 and 11 and so that it may be arranged to have its free end extend beyond the ends of the layers 11 and 12. This arrangement is carried out by doubling the leader 14 upon itself at the connection 16 and folding the elongated portion 17 around the ends of the joined layers 11 and 12 and into contact with the hinge portion of the leader to a position adjacent the end of layer 11, where the elongated leader portion 17 is again doubled upon itself to reverse its direction and to extend in its reverse direction from the last-mentioned fold to a location beyond the hinged end of the film assembly.

Leader portion 17 may have a width similar to the width of the hinge portion of the leader. Preferably, however, leader portion 17 is made considerably narrower than the hinge portion of the leader and, for reasons which will hereinafter appear, is given a width approximately equal to that of cutaway portions located in the end members of the frames of a cassette or holder, such as the cassette schematically illustrated in Fig. 6. In fact, the free end of the leader adapted to lie in the just-mentioned cutaway portions provides manually engageable means for straightening out the folded leader portion 17 preparatory to withdrawing the film assembly from a cassette into which it has been loaded. It is to be observed that the leader portion is readily straightened from its folded condition illustrated in Fig. 2 by the exertion of sufficient pulling force on the free end of the leader.

A rupturable container 18, holding a liquid photographic processing composition, is mounted between liquid-confining layers 11 and 12 and is located at the hinged end of said layers to extend transversely thereof for the discharge of its liquid content, upon rupture between said liquid-confining layers.

The container 18 is secured in the manner described by a flexible adhesive strip 19 adhered to the leader 14 and to the container 18, as detailed in Fig. 2, and is adapted to seat on a light-opaque envelope 20, which is removably secured around the liquid-confining layer 11 and the photosensitive portions thereof, or to seat on the leader 14 when said envelope is removed. Container 18 is formed of a substantially liquid- and oxygen-impervious material and has marginal portions of the walls thereof releasably sealed together, whereby pressure applied to opposite sides of the container will force the liquid in the container to rupture the seal along the trailing edge of the container, i. e., the edge of the container farthest from the hinge means for layers 11 and 12, and discharge said liquid for spreading in contact with the liquid-confining layers. In length, container 18 is sufficiently long to extend almost fully across the liquid-confining layers 11 and 12 and tape 19 is of a length similar to that of the container. When carrying out a transfer process, the liquid within the container preferably comprises a viscous solution of a thickening agent, a silver halide developer and a silver halide fixer. However, such materials as the developer and fixer may be incorporated in some layer or layers of the film assembly, in which case the container need only hold a solvent for these materials. Also, while in general a thickening agent is preferred, the invention may be practiced without the use of said agent. In any event, the film assembly is adapted to contain processing material which is rendered effective to process an image upon rupture of the container and the discharge of its liquid content, this processing material including a photographic reagent in an amount sufficient to process said image.

In carrying out a transfer process, image-forming complexes are transferred from the photosensitive material to the print-carrying element. A mask 21, formed of thin tissue paper such as condenser paper, is adhered by use of a strippable adhesive to the liquid-confining layer 12 and is employed to assist in confining the deposition of these image-forming complexes to a predetermined location or picture area on the liquid-confining layer 12. As shown, mask 21 is provided with a rectangular aperture 22 which defines the picture area for the transfer image. In width, the mask 21 is made substantially equal to the width of the liquid-confining layer 12. Mask 21 may be cut out in one piece from condenser paper of appropriate size. Alternatively, mask 21 may comprise a plurality of pieces, as for example four or more individual strips, of condenser paper which are cut to appropriate lengths and widths and which are adhered to the liquid-confining or print-receiving layer 12 in a manner to duplicate the mask shape illustrated in the drawings. When the liquid-confining layers 11 and 12 are separated, after processing of the film assembly, the image-receiving or liquid-confining layer 12 is adapted to be stripped from the mask 21.

A pair of spacer strips 23, formed for example of suitable paper, are secured as by an adhesive to the outer surface of the mask 21. Each strip 23 has a length substantially equal to that of the mask and extends lengthwise of the mask adjacent a longitudinal edge thereof and between said edge and the mask aperture 22. These spacer strips assist in controlling the spreading of the liquid content of the container and in confining the liquid to a surface area lying within the spacers. Spacers 23 will of course be removed with the mask 21 when the mask is stripped from the liquid-confining layer 12.

While a mask 21 and spacer strips 23 are preferably mounted upon liquid-confining or print-receiving layer 12 to provide a composite structure, it is to be noted that they are not an essential to the formation of a transfer image.

The film assembly 10, after removal of the envelope 20 and exposure of the photosensitive area of liquid-confining layer 11, is intended to be processed by drawing the attached liquid-confining layers 11 and 12 and container 18 between a pair of wringer or spreading rolls which apply pressure to the opposite sides of the assembly. In processing, the film assembly is fed between the pressure-applying rolls from its hinged end, which provides the leading end of the assembly.

When the film assembly is passed between the pressure or spreading rolls, the container is ruptured and its liquid content is discharged and spread in a thin layer or film from the leading end of the film assembly toward the trailing end thereof. The rupturable container, in order to insure operation of the film assembly, is filled with more liquid composition than is needed to process the image area or areas thereof. Continued pressure contact of the spreading rolls with the film assembly until the trailing edge of the assembly has passed through the rolls will force excess liquid composition outwardly of the film assembly at the trailing edge thereof. This is objectionable not only from the standpoint of manual contact when handling the processed film assembly but also from the standpoint of fouling the spreading rolls.

If the pressure applied by the processing rolls to the outer surfaces of a film assembly undergoing processing is released before the trailing edge of the assembly has passed between the rolls, the liquid composition will cease to be spread in a thin film and will collect in a relatively thick layer and become trapped between the spreading surfaces, i. e., the inner faces of the photosensitive and print-receiving elements, within a location which extends from the position of roll pressure release to the trailing end of the film assembly. Trapping by roll separation may be effected by means associated with the processing apparatus itself or by means provided on the film assembly for forcing the rolls apart. Either type of trapping will obviously require special structural features for the film assembly.

A concept of the present invention is to employ the mask of the film assemblies disclosed herein not only for the purpose of defining the image area on the image-receiving layer when carrying out a transfer process, but also for the purpose of trapping excess liquid processing composition. Thus, the mask used in all of the film assemblies disclosed herein is provided with an extension which extends the mask beyond the image-receiving layer and which is employable for trapping excess processing composition.

For example, the film assembly 10 of Fig. 1 through 3 utilizes mask 21 provided with an extension 24 at the trailing end of the layer 12, i. e., the end of said layer which is farthest removed from the hinged end of the film assembly. The film assembly 10 is intended for use in processing apparatus which is provided with means for separating the spreading or pressure rolls just before the trailing end of the film assembly has passed through the rolls. From the standpoint of simplified film construction, this type of film assembly is preferred. The just-mentioned roll separation is intended to take place at a position on the film assembly 10 which is located on the mask extension 24 at a short distance from the trailing end thereof. With an image-receiving layer having an overall length of thirteen inches inclusive of the mask extension, the roll separation takes place at about ⅝ of an inch from the trailing end of the mask.

It will be observed that under these conditions the roll separation will occur after the liquid has been discharged from the container and spread from the container mouth in a thin and substantially uniform film to a position beyond the end of the image-receiving layer 12. At the latter position the liquid begins to collect and to become trapped. Since the mask is made of material which is flexible, the extension portion 24 will be bent or curled slightly away from the photosensitive layer 11 but only over a portion of the photosensitive layer 11 which is outside of the image area thereof. When a transfer print is formed, contact of the trapped liquid with the image-receiving layer 12 is precluded when this layer is stripped from the mask.

Processing apparatus which is unprovided with means for separating the pressure-applying or spreading rolls utilizes a roll arrangement wherein the rolls are spring-loaded and are constantly urged toward each other but are so mounted that they may be separated or moved apart in accordance with the thickness of the material passed between them. Suitable trapping members which function as roll-separating means by increasing the thickness of the material passed between the spreading rolls are usable for this purpose when mounted on the mask extension. Such means are shown in Figs. 7, 8 and 9 and comprise one or more difficultly compressible members. Each difficultly compressible or trap member is formed of a flexible material which is sufficiently rigid to withstand a roll loading equivalent to a compressive force of six to ten or more pounds without failure and substantially without distortion. Suitable paper or sheet plastic materials are usable for this purpose. These roll-separating means are positioned and proportioned to effect a roll separation, when engaged by the spreading rolls, which is sufficient to release the spreading pressure exerted transversely of the film whereby to permit the liquid composition to collect and become trapped on the mask extension.

One embodiment making use of roll-separating means of the character just described is disclosed in Fig. 7 wherein an image-receiving sheet or layer 312 is illustrated from the mask-carrying side thereof and, as may be observed, is provided with a mask 321 having an extension portion 324. As disclosed in Fig. 7, a single difficultly compressible member 332 is mounted on the mask extension 324 adjacent the trailing end thereof. Member 332 is illustrated as being mounted on the surface of the mask extension 324 which is farthest removed from the side of the mask adhered to the image-receiving layer 312 and is proportioned to extend transversely from the mask extension substantially from edge to edge thereof but is narrower than the length of the mask extension whereby a portion of the mask extension remains uncovered.

As may be observed, the difficultly compressible member 332 is provided with a plurality of spaced-apart cut-away portions or channels 333 on the leading edge thereof and adapted to provide bays or the like located transversely of the mask 321 for receiving excess liquid. Spacer strips 323 are also employed on the image-receiving layer 312 and function in the same manner as the spacers 23 to confine the spread liquid. Spacers 323 may be stopped adjacent the member 332, which possesses a thickness greater than the thickness of the spacers.

As a film assembly equipped with the receiving layer 312 is passed between the spreading rolls, the portion thereof having the member 332 will effect separation of the rolls and will permit trapping of the excess liquid on the extension portion of the mask. In this regard, it is to be noted that the portions of the mask extension 324 lying within the cutaway parts or channels 333 of member 332 will function in a manner similar to that described in connection with the mask extension 24 of Figs. 1 and 2. Member 332 is secured to the mask extension 324 by a suitable adhesive, of which many are well known.

As previously pointed out, a plurality of difficultly compressible members, rather than a single member, may be employed for trapping by roll separation. Such an embodiment is disclosed in Figs. 8 and 9 wherein an image-receiving layer 412, similar to the image-receiving layers 12 and 312, is provided with a mask 421 having an extension 424. The usual spacer strips 423 are shown as mounted over the mask 421.

In the embodiment of Figs. 8 and 9, two difficultly compressible members 435 and 436 are shown as mounted adjacent opposite edges of the mask extension 424 at the trailing end thereof. The members 435 and 436 function in a manner similar to the difficultly compressible member 332 of Fig. 7. Preferably, the construction disclosed in Figs. 8 and 9 is employed with spreading rolls made of steel or other suitable metal. On the other hand, the embodiment of the invention disclosed in Fig. 7 makes use of a construction having a difficultly compressible member 332 which is usable with spreading rolls made of rubber or metal or wherein one roll is of rubber and the other is of metal.

In both embodiments disclosed in Figs. 7 through 9, the difficultly compressible members 332, 435 and 436 have been disclosed as mounted upon the surface of the mask extension which lies outwardly or away from the image-receiving layer. The scope of this invention comprehends mounting these difficultly compressible members on the surface of the mask extension which will be located next to the image-receiving layer. In fact, depending upon the roll mounting, such an arrangement may be preferred, especially in the use of two or more difficultly compressible members such as the members 435 and 436.

It has already been mentioned that a developed and fixed image in any of the film assemblies of this invention may be provided without the use of a mask and the spacer strips disclosed in the drawings. When such practice is carried out, if desired, a relatively small sheet of flexible material, such as mask material, may be adhered to the trailing end of either liquid-confining layer of the film assembly for the purpose of providing the trapping means disclosed herein. Such an extension may be strippably or otherwise adhered to the liquid-confining layer with which it is associated and is adapted to have any of the roll-separating or difficultly compressible members shown in Figs. 7 through 9 mounted thereon.

In all of the receiving sheet constructions illustrated herein, it is to be observed that the trailing end of the image-receiving layer, such as the layer 12 of Fig. 1, is lapped over the mask. This provides a joint which may be manually engaged at a corner for stripping the image-receiving layer from the photosensitive layer after the film assembly has undergone processing. Alternatively, special tabs may be provided on the outer surface of the image-receiving layer.

For example, a tab may be provided adjacent the trailing end of the image-receiving layer and centrally thereof or at each side of the receiving sheet. Such tabs may be secured to the outer surface of the image-receiving layer as by a suitable adhesive. In lieu of this construction, an extension may be provided on each end of the receiving layer. This latter embodiment is disclosed schematically in Figs. 10 and 11 which are, respectively, a plan view of an image-receiving layer 512 viewed from the outer surface thereof and an end view of said image-receiving layer. A mask 521, similar to the mask of Figs. 1 through 3, is illustrated as being secured to the under surface of the image-receiving layer 512 and is provided with the usual mask extension which extends the mask beyond the trailing end of the layer 512. The usual spacer strips 523 are shown on the mask 521. It may be noted that the image-receiving layer 512 is provided with tabs 537 which are integral with the layer and which extend at the trailing end thereof from adjacent each edge of said layer toward the trailing end of the mask extension. These tabs 537 are unconnected to the mask 521 whereby they may be readily engaged by the fingers when stripping the film assembly apart.

It is desirable to provide means which permit the film assembly 10 to be handled in the presence of light which is actinic to the photosensitive material of the film. For this purpose, use is made of the previously mentioned substantially light-opaque envelope 20. Envelope 20 is adapted to be removably mounted around the liquid-confining layer 11 having the photosensitive area thereon and may be formed of conventional flexible material, such as paper or the like, which is rendered opaque to visible and near visible light by an appropriate black dye or pigment. One suitable material for forming the envelope 20 comprises appropriate film leader stock.

By one practice, envelope 20 may be conveniently made from a one-piece blank 200 (Fig. 4) which has an envelope wall-forming section 225 extending from one end thereof to a position beyond the longitudinal center of the blank where it is joined by an envelope wall-forming section 226 extending to the other end of the blank. In addition to being shorter than the section 225, section 226 of the blank 200 is narrower and is symmetrically arranged with respect to section 225 whereby marginal portions along the longitudinal edges of section 225 extend beyond the longitudinal edges of section 226 by equal distances on each side of section 225. These overhanging marginal portions are indicated by the reference character 227 as lying between the longitudinal edges of the section 225 and the dash and dot line 228 shown in Fig. 4 and along which the marginal portions 227 are adapted to be folded. Adjacent the junction of the blank sections 225 and 226, each marginal portion 227 is inclined inwardly toward the longitudinal edges of the blank section 226, as indicated at 229. This inclination is made at any convenient angle, for example an angle of 45°.

Formation of envelope 20 takes place by folding the blank 200 transversely of itself along a line which connects the outer extremities of the inclined parts 229 of the marginal portions 227 of the section 225. A fold line of this character is shown by the dot and dash line 230 in Fig. 4. The result of folding blank 200 along line 230 is to arrange the wall-forming sections 225 and 226 in overlying relation to each other. Each of the marginal portions 227 of the blank is then folded over into contact with the wall-forming section 226 and is suitably adhered thereto. Sealing of the marginal portions 227 may be effected by the use of a conventional adhesive. For example, either or both of the wall-forming sections 225 and 226 may be provided with appropriately positioned coatings of a pressure- and/or heat-sensitive adhesive whereby the marginal portions 227 may be suitably sealed to the surface of the wall-forming section 226 adapted to provide an outer surface for the envelope.

For a reason which will presently appear, wall-forming portion 226 is provided with a notch 231 located in the end thereof which forms an end of blank 200 and centrally of said end.

It is to be noted that the inclined ends 229 of the marginal portions 227 make it possible to obtain a double fold of material at the common ends of the wall-forming sections 225 and 226 of the blank 200. This is advantageous in providing an extremely effective light seal for preventing access of actinic light into the envelope. Furthermore, the inclined portions 229 serve as index means in folding the blank 200 into the envelope shape.

An envelope 20 formed from blank 200 is detailed in Figs. 2 and 5. As shown, envelope 20 has two overlying wall members 25 and 26 corresponding respectively to the wall-forming sections 225 and 226 of the blank 200. Wall member 26 has a notch 31 corresponding to notch 231 of blank 200. These wall members 25 and 26 are connected together along their longitudinal edges and are integral with each other at one end whereby the envelope may be constructed with a closure means at the opposite end. As may be noted, envelope wall member 25 is longer than wall member 26. The portion of wall member 25 which extends beyond wall member 26 is adapted to provide a closure flap or extension 27 and is used to close the envelope and to secure it to the film assembly 10.

It will be understood that envelope 20 may embody construction details other than those specifically described.

For example, while formation of the envelope from a one-piece blank is generally preferred from the standpoint of simplified assembly, it will be appreciated that the envelope may be formed from two separate pieces of sheet material which are sealed together along their overlying marginal edges and at one end thereof. These and other variations in envelope construction and design are deemed to fall within the concept of this invention.

Access into the envelope is from the end thereof provided with the extension or closure flap 27. The portion of the film assembly comprising the photosensitive or negative layer 11 is inserted within the envelope in a manner such that the envelope wall 26 lies between layers 11 and 12. Envelope wall member 26 is longer than photosensitive layer 11 so that the ends of the layer 11 may be located between the ends of wall member 26 when the envelope is operatively encasing said layer. In this regard, wall 26 extends from the closed end of the envelope to a position adjacent the leading edge of the container 18 whereby the container may be seated on the outer surface of the envelope wall 26 when the envelope is engaged around the layer 11 and assists in providing a light-tight closure at the hinged or leading end of the film assembly.

As previously pointed out, the end extension or closure flap 27 of the envelope wall 25 is utilized to secure the envelope to the film assembly. In this regard, the extension 27 will permit the end portion of the wall member 25 to be wrapped or folded around the leader 14 and over the leader tape 16 for attachment thereto and also to the outer surface of the liquid-confining or print-receiving layer 12 by an adhesive strip or tape 28 which extends transversely and substantially across the film assembly.

An important feature of the film assembly of this invention resides in securing the envelope 20 for easy removal from the film assembly. In accomplishing this, use is made of the tearable or severable nature of the envelope material in conjunction with means for severing the same and provided by an endless tear-string 29 which is engaged around the end extension or closure flap 27 of the envelope wall 25 prior to folding the portion 27 around the layers 11 and 12 for securing the envelope to the layer 12. The endless tear-string 29 is provided with a loop of greater length than the transverse dimension of the envelope 20. Application of appropriate pulling force to the tear-string is utilized to cause the severance of the closure flap or extension 27 transversely of itself at a position near the seal 16 whereby to permit the envelope 20 to be removed from the layer 11.

The constructional features of the film assembly cooperate to provide a light-tight closure for the envelope 20 at the leading end of the film assembly. For example, the layer 11 having the photosensitive portion thereon is of a width whereby it fits snugly within the envelope, yet is slidable therein. In addition, the leader 14 is so arranged that the container 18 may be seated on the free or leading end of the envelope wall member 26 whereby to cover said wall member and press it into contact with the supporting leader. Furthermore, leader 14 is formed of conventional film leader material and is itself substantially opaque to actinic light. The end portion 27 of the wall member 25 completes the light-tight closure by being drawn tightly around the end of the film assembly and having its free end fixed to the outer surface of the layer 12.

To facilitate handling of the film assembly 10, use is made of a tab member 30 which is located at the leading edge of the assembly and has a portion adjacent the trailing edge thereof adhered, as by an adhesive, to the liquid-confining or print-receiving layer 12 and the securing tab 28 which connects the envelope 20 to the layer 12. Handling tab 30 is of a convenient length and width for manual engagement and is centered on the longitudinal axes of the film assembly whereby the leading edge thereof may be located within cutaway portions provided in a pair of end members of a cassette within which the film assembly 10 is mountable. A flexible material such as paper, for example film leader stock, may be used to form the tab 30. It is to be noted that the base or body portion of tab 30 is in effect hingedly connected to the outer surface of the liquid-confining or print-receiving layer 12 whereby it may be pressed into contact with said layer or angularly inclined thereto, as indicated by the dash line in Fig. 2.

The film assemblies of this invention are intended to be individually mounted or loaded into a holder or cassette for the purposes of carrying out the exposure thereof. The opaque envelope 20, which is in light-tight engagement around the photosensitive element 11, makes it possible to handle and even store the film assembly 10 in daylight or under other actinic illumination prior to loading the assembly into a holder. As it is well understood, film holders are provided with a substantially light-tight compartment adapted to carry the film to be exposed. Film holders usable in conjunction with film exposure by visible or near visible light are provided with an opaque closure slide employed to effect the opening and substantially light-tight closure of an exposure aperture in the holder. When film exposure is made by radiation which will penetrate through the material of the holder, such as by X-rays or gamma rays, it is unnecessary to equip the holder with a closure slide.

In the present invention, once the film assembly 10 is loaded within the light-tight compartment of the holder, it is desirable to remove the envelope from its light-tight encasing relation with the photosensitive layer or element 11. This may be accomplished by providing the holder with a passageway through each end thereof. Each said passageway extends through the end members of the holder in direct communication with the film-holding compartment in the holder. These passageways possess appropriate dimensions to permit sliding movement of the film assembly therethrough. Suitable light-seal means are associated with each end passageway whereby to substantially prevent the access of actinic light into the holder.

In this regard, one construction for a holder or cassette makes use of two superposable frames which are adapted to be removably secured together and which are so constructed that a film passageway is provided at each end thereof. An individual plate member is carried within each frame and is so constructed and arranged as to provide a substantially light-tight closure for the aperture in the frame. A holder or cassette of this general character and especially designed for use with the film assemblies of this invention for carrying out X-ray photography is detailed and described in copending application Serial No. 227,238, filed May 19, 1951 by Albert J. Bachelder et al. for X-Ray Cassette, now Patent No. 2,709,223.

Removal of the envelope 20 from the film assembly may be understood with reference to Fig. 6 which is a schematic plan view of a cassette 40 of the character having a passageway through each end thereof and shows the cassette with a film assembly 10 loaded therein. Fig. 6 is intended to show the rear face of the cassette as distinguished from the front face through which exposure of the film assembly is adapted to take place.

The film assembly 10 is adapted to be mounted within the cassette 40 so that the leading end of the envelope 20, i. e., the end of the envelope at the hinged end of the film assembly, is located substantially flush with either end of the cassette. Fig. 6 illustrates the leading end of the film assembly 10 located in this manner at the left end of the cassette. Cassette 40 is so proportioned that the end portion 24 of mask 21 of the film assembly will be substantially flush with the opposite end of the cassette, i. e., the right end of the cassette in Fig. 6. Since envelope 20 extends beyond the unconnected ends of the layers 11 and 12, a portion thereof will, as illustrated, protrude from the right end of the cassette. It will also be observed that by this arrangement, a portion of the severing cord 29 will be located outside of the left end of the cassette.

In Fig. 6 the envelope 20 is placed downwardly so that the print-receiving layer 12 will be furthest removed from the front of the cassette and will be located adjacent the back of the cassette. Handling tab 30, which is located along the longitudinal center line of the film assembly, will be positionable within one of the cutaway portions 41 provided centrally in each end member of the back of the cassette and is shown as so located and also in overlying relation to the closure flap 27 of the envelope. Cutaway portions, similar to the cutaway portions 41, but not shown in Fig. 6, are provided in the end members of the front frame of the cassette 40. Consequently, the free end of the elongated portion or leader extension 17 will be located within a cutaway portion in the left end member of the front frame of the cassette 40. Cutaway portions, such as the cutaway portions 41, permit manual manipulation of the film assembly and facilitate its removal from the cassette.

To remove the envelope 20 from the closed cassette 40, the severing string 29 is pulled outwardly or away from the end of the cassette by one hand while holding the trailing end of the envelope 20 with the other hand. This results in detaching the envelope 20 from the film assembly by severing the closure flap portion 27 of the envelope whereby the envelope may be withdrawn from the cassette by holding the handling tab 30 while pulling the envelope 20 by the portion thereof which protrudes from the cassette in a direction outwardly of the cassette. The cut-out portion 31 in the envelope wall member 26 avoids accidental holding of the envelope at the hinged end of the film assembly while endeavoring to withdraw the envelope from the cassette.

The photosensitive portion of the film assembly is now protected only by the cassette itself. Exposure thereof is made in a suitable manner. For example, in the case of X-rays, exposure is made through the front of the cassette. Following exposure, the film is ready for processing, which is simply effected by the use of a pair of pressure rolls as hereinbefore described. These rolls function to withdraw the film assembly from the cassette 40. Processing is carried out in the absence of light and may conveniently take place in apparatus comprising a lighttight box in which the pressure rolls are mounted and which is provided with a hinged cover or other closure to permit the cassette to be positioned on a support within said box for operative engagement of the film assembly with said rolls.

Before placing the cassette in the processing box, the leader extension 17 is manually pulled outwardly from the cassette. This extends the leader for a distance of several inches beyond the end of the cassette. The cassette is then placed in the processing box with the end of the cassette aligned with the axes of the pressure rolls and with the end of the extended leader portion 17 positioned between said rolls. Means are provided for holding the cassette within the processing box in the just-described position.

The processing box is then closed and the rolls are brought into pressure contact and rotated. This causes the exposed film assembly to be withdrawn from the cassette, which is fixedly held with respect to the rolls, and discharges the film from the rolls, at least in part, into a lighttight imbibition chamber in the processing box. The processing rolls are so arranged that they are separated when the trailing end of the film assembly, including a part of the trailing end portion 24 of the mask 21, has been moved to a position between the rolls and at this time the rotation of the rolls is arrested. The processed film assembly is allowed to remain in the lighttight imbibition chamber for a time sufficient to permit the image-forming reactions to be carried out, i. e., for an imbibition time of about one minute, and is then removed from the imbibition chamber. Layers 11 and 12 of the processed film are then stripped apart, the transfer image being provided on the layer 12.

As already mentioned, it is desirable to add a thickening agent to the liquid within the container 18. A preferred thickening agent is a viscous organic film-forming material which is adapted to adhere the mask 21 and the spacer strips 23 to the layer 11 by a bond which is stronger than the adhesive bond between the mask and the layer 12. By such practice the mask 21 will be stripped from layer 12 when the image-receiving layer 12 and the layer 11 are separated. Layers 11 and 12 may be completely disconnected from each other after they have been separated as by peeling apart.

Where, in X-ray work, a transfer image is desired, it is preferable to expose the film assembly through the emulsion base or support, i. e., the back of the emulsion, whereby to prevent geometrical reversal of the transfer print. However, if geometrical reversal is unimportant, exposure by X-rays may be made through the image-receiving layer 12. When the exposing radiation is visible or near visible light, geometrical reversal of the transfer image may be avoided by using a transparent material for the positive or image-receiving layer 12 and by directing the exposing light therethrough and onto the face of the photosensitive layer 11, i. e., the front of said layer.

As previously indicated, the photosensitive layer 11 comprises a base or support which carries a coating of a photosensitive material. This base may be an opaque material, for example baryta paper, or it may be a transparent material of which many are well known to the art. As examples of a few transparent materials suitable for this purpose and also for use as the image-receiving layer 12, mention is made of such organic plastics as regenerated cellulose; polyhydroxy alkanes, such as polyvinyl alcohol; sodium alginate; and cellulose ethers, such as methyl cellulose or other derivatives such as carboxymethyl cellulose or hydroxyethyl cellulose.

A film assembly, such as the assembly 10, is especially adapted for use with means providing an intensifying screen of the type utilized in X-ray photography. In this regard, a conventional intensifying screen may be positioned between the envelope 20 and the image-receiving layer or positive element 12 at the time the film assembly is loaded within a holder or cassette. The intensifying screen is positioned so that a side which carries a coating of fluorescent screen material is located next to the envelope wall member 26 and consequently in overlying relation to the photosensitive material of the photosensitive layer 11. Preferably, means are provided at one or more edges of the intensifying screen and in the cassette for retaining the screen against longitudinal movement tending to occur when the film assembly and the envelope are withdrawn from the cassette. Details of screen construction and cassette construction are disclosed in the previously mentioned copending application of Albert J. Bachelder et al. Alternatively, either of the liquid-confining layers 11 or 12 may carry a layer of fluorescent screen material which may be coated on the inner or directly overlying surface of these layers.

As has been pointed out, film assembly 10 is especially adapted to carry out a photographic transfer process and has been illustrated as provided with a photosensitive silver halide layer 11 and a print-receiving layer or element 12. As it is now well understood to the art, a photographic transfer process is usable to provide in a print-receiving layer, such as the liquid-confining layer 12, a reverse image of a latent image contained in a photographic silver halide negative material, such as the liquid-confining layer 11. In the use of a silver halide photosensitive element, transfer processing includes spreading a photographic developer and a silver halide fixer between the liquid-confining layers and bringing the layers into contact with each other. As previously pointed out, this may be accomplished by applying pressure to the opposite sides of the film assembly 10 by drawing the assembly through a pair of pressure-applying or wringer rolls. The result of this processing is to develop latent image to silver and to form in the photosensitive material, carried by the layer 11, a soluble silver complex from unexposed silver halide for transfer to the layer 12, which acts as a print-receiving element. This complex, at least in part, is transferred by inhibition to the print-receiving layer where it is developed to silver to provide the desired reversed image. After completion of processing, the layers 11 and 12 are stripped apart.

In certain instances it is desirable to provide a developed and fixed negative image without forming a transfer or positive image. Film assembly 10 is adapted for this practice by appropriate formulation of the processing liquid employed in the container.

Photosensitive assemblies such as those illustrated herein are useful in carrying out a photographic transfer process and in providing a self-developing film. The principles of a transfer process, as well as specific film structures suitable for carrying out the same and for providing self-developing film units, are set forth in United States Patents Nos. 2,543,181, issued February 27, 1951 to Edwin H. Land for Photographic Product Comprising a Rupturable Container Carrying a Photographic Processing Liquid and 2,544,268, issued March 6, 1951 to Edwin H. Land for Photographic Product, and also in the copending applications of Edwin H. Land, Serial Nos. 652,612, filed March 7, 1946 (now Patent No. 2,634,886), 728,983, filed February17, 1947 (now Patent No. 2,603,565), 7,795, filed February 12, 1948 (now Patent No. 2,647,056) and 185,642, filed September 19, 1950 (now Patent No. 2,565,378), Patent No. 2,544,268 and Serial No. 185,642 being specific to film assemblies especially adapted for X-ray photography. These various copending applications and said patents include detailed descriptions of film assemblies which employ a liquid-confining layer having a photosensitive area and a liquid-confining layer in the nature of a print-receiving element and which are adapted to contain all of the photographic materials needed to process the assembly. Also, the said patents and copending applications are detailed as to containers for holding processing materials and further include descriptions of liquid processing compositions usable with film assemblies including, in Patent No. 2,544,268 and Serial No. 185,642 (now Patent No. 2,647,056), a liquid processing composition employable to develop a negative without forming a positive image. The practices, photographic materials and compositions described in said patents and applications are generally suitable for carrying out the present invention and special reference to the details thereof is made in the just-mentioned copending applications and patents.

While this invention has been specifically described in connection with silver halide as the photosensitive material, it is pointed out that the scope of the invention embraces other photosensitive materials, i. e., any material which is capable of having a developable image formed therein upon exposure to actinic radiation. When developable photosensitive materials other than silver halides are employed for the photosensitive layer 11, the product will carry suitable developing agents and such other liquid as is necessary to render said agent operative to effect the development of the photosensitive layer.

In this regard, it is well known that certain diazonium compounds are destroyed by light and photographic processes involving such compounds as their photographic materials have ben used commercially. There are several known ways in which a diazonium salt layer may be exposed and developed to produce a relatively stable image. In each of these processes the treatment of the photosensitive diazonium layer may be accomplished by applying thereto a liquid containing certain developing reagents. (L. P. Clerc, "Photography Theory and Practice," second edition, published 1937 by Pitman Publishing Company, page 444, paragraph 693.)

The products of the present invention may be used in conjunction with or may comprise as elements thereof diazonium photosensitive layers. For example, in the product of Fig. 1 the photosensitive layer 11 may have as its photosensitive substance a diazonium compound such as that sold by the Boston Blue Print Company under the name "Blackline #202," and the liquid reagent in the container 18 then preferably comprises a mixture of sodium carboxymethyl cellulose, water and "Blackline" developer #203½ (sold by Boston Blue Print Company and manufactured by Frederick Post Company, Chicago). In the alternative, the photosensitive layer 11 may be obtained by applying to one side of a suitable sheet material a sensitizing solution which consists of 20 grams of chlorostannate of para-diazo-di-N-butyl-aniline, 0.4 gram of Pontacyl Brilliant Blue 2R, and 1 liter of water. The liquid-developing reagent in the container 18 then preferably comprises, by weight, 4 parts of medium viscosity sodium carboxymethyl cellulose, 100 parts of water, 5.8 parts of sodium carbonate (monohydrate) and 2.3 parts of phloroglucinol.

It is also well known that certain ferric salts of organic acids, for example the oxalates, tartrates, and citrates, are reduced to ferrous salts when exposed to light. (L. P. Clerc, "Photography Theory and Practice," second edition, published 1937 by Pitman Publishing Company, page 402, paragraph 621 et seq.; Crowley Patents Nos. 2,093,421, 2,113,423, 2,130,070, 2,130,071, 2,137,015.) A considerable number of photographic processes depend for their functioning on these photochemical phenomena. It is known in connection with these iron salts that any reagent that will differentiate between ferric and ferrous salts can be used to develop the barely visible image formed by the photochemical reduction of the ferric salt into an image which is very easily visible. Examples of such developing reagents are potassium ferricyanide, potassium ferrocyanide, tannins, gallic acid, B-naphthoquinone-sulphonic acid, silver salts, platinum and palladium salts. It is believed to be now apparent to one skilled in the art that the photosensitive ferrous salts may constitute the photosensitive material of the photosensitive layer 11, and the liquid in the container 18 may include or dissolve in its travel to the photosensitive layer any one of the aforementioned developing reagents for distinguishing between the ferric salts and producing the easily visible image from the very light image that is originally obtained by the photoexposure of the iron salts.

The film assemblies of this invention are subject to various modifications. For example, the extension 17 of the leader means 14 may be a separate portion. In such event the extension may be secured to the outer surface of the liquid-confining layer or image-receiving layer 12 and may then be folded over upon itself and into a position corresponding to the leader means shown in Fig. 2. By the last-mentioned construction, the liquid-confining layer 11 may be given an extended length so that its leading end is aligned with the leading end of the image-receiving layer 12. Also, with such construction, it is possible to secure the end of the leader extension member to the portion of the leader connected to the photosensitive layer 11 and, by doubling it over upon itself, simulate the fold arrangement of Fig. 2 for the leader means. These and other variations in the construction of the film assembly are included within the concept of this invention.

Additionally, other means for disconnecting the envelope 20 from the film assembly may be employed instead of the tear string arrangement detailed in connection with Figs. 1 and 2. For example, the flap portion 27 of the envelope wall member 25 may be made considerably longer than shown in the drawings whereby the flap portion, after being wrapped around the leading end of the assembly, may be secured to the outer surface of the liquid-confining layer 12 by a strippable adhesive bond and may be doubled over upon itself adjacent said bond to extend outwardly from said leading end of the assembly. In such an arrangement, the envelope is disconnected from the layer 12 merely by pulling on the folded-over portion of the elongated envelope flap. In such use, the handling tab 30 is mounted upon the liquid-confining layer 12 in a manner similar to that already disclosed.

While the present invention has been described in connection with photography, including X-ray photography, it will be appreciated that the concepts set forth herein include other fields. For example, a loaded cassette provides an excellent means for indicating and/or measuring dosages of nuclear radiation, such as electromagnetic radiation having a wavelength shorter than the wavelength of radiation within the ultraviolet region of the spectrum and including, besides X-rays, gamma rays and corpuscular radiation, such as alpha particles, beta particles, fission product particles, and the like. Inasmuch as the photosensitive materials employed are sensitive to nuclear radiation of the character described, and since such radiation will penetrate the cassette and effect exposure of the photosensitive material, the importance of this invention as applied to dosimetry will at once be understood. Furthermore, a film assembly which has been exposed to nuclear radiation may be processed in the manner previously indicated. The transfer print provided in a film assembly which has been exposed to nuclear radiation and which has been processed will be uniformly grey or white throughout its entirety. The term "image" as employed herein is intended to include a print of this just-described character.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photosensitive film assembly comprising a first liquid-confining layer, a second liquid-confining layer positionable in superposed relation to the first liquid-confining layer, hinge means connecting said layers together at one end thereof for pivotal movement toward and away from each other, a container holding a liquid composition and located between and extending transversely of the liquid-confining layers for discharge of its liquid content for spreading between said layers, said first liquid-confining layer constituting a photographic element having a photosensitive portion on one surface thereof, said layers being superposed with said photosensitive portion of said first liquid-confining layer located next to said second liquid-confining layer, said photosensitive portion being capable of having an image formed therein upon exposure, said film assembly containing processing material and including a photographic reagent in an amount sufficient to process an image formed in said assembly, said liquid composition, upon rupture of said container, rendering said processing material effective to process said image, an envelope having a first wall member and a second wall member located in overlying relation and connected together at a first end thereof and along the overlying marginal edges extending from said first end to the second end of said envelope, said second envelope wall member being provided with an extension at the second-mentioned end of said envelope, said envelope being releasably engaged around said first liquid-confining layer with the first envelope wall member located between said first and second liquid-confining layers and with said hinge means of said film assembly adjacent the second-mentioned end of said envelope, said envelope, including said extension, being formed of material substantially opaque to radiation over a wavelength range in the electromagnetic spectrum which extends from within the ultraviolet region to within the infrared region thereof, said extension being folded around the hinge end of said film assembly, securing means for holding said extension in said folded condition and for retaining the extension in overlying relation to said hinge means, the folded and retained portion of said extension, together with said second liquid-confining layer, providing means for closing said envelope at the second end thereof to the access of said radiation, and said envelope extension being provided with a portion which extends in a direction transversely of said envelope and which is severable from the extension portion, said severable portion providing means for opening said envelope to permit withdrawal of said envelope from said film assembly.

2. A photosensitive film assembly comprising a first liquid-confining layer, a second liquid-confining layer positionable in superposed relation to the first liquid-confining layer, a strip of flexible material, one end of said strip being secured to one of said layers, said strip, at a position intermediate its two ends, also being secured to the other of said layers, the portion of said strip between the positions of connection thereof to said layers constituting a hinge portion providing means for hingedly connecting said layers together at one end thereof and the remaining portion of said strip being elongated and providing leader means adapted to assist in the processing of said film assembly, the elongated leader portion of said strip being folded into contact with said hinge portion and into contact with itself and having its free end extending beyond the hinged end of said film assembly in a direction away from the opposite end of said film assembly, said first liquid-confining layer constituting a photographic element and being provided with a photosensitive portion which is capable of having an image formed therein upon exposure to radiation within the electromagnetic spectrum, said photosensitive portion forming at least a part of the face of said first liquid-confining layer which is located next to said second liquid-confining layer, a rupturable container holding a liquid composition and located between and extending transversely of said liquid-confining layers in a position for discharge of its liquid content for spreading between said layers, an envelope having a first wall member and a second wall member located in overlying relation and connected together at a first end thereof and along the overlying marginal edges extending from said first end to the second end of said envelope, said second envelope wall member being provided with an extension at the second-mentioned end of said envelope, said envelope being releasably engaged around and encasing said first liquid-confining layer with the first envelope wall member located between said first and second liquid-confining layers and with said hinge means of said film assembly adjacent the second-mentioned end of said envelope, said envelope, including said extension, of said envelope, said envelope, including said extension, being formed of material substantially opaque to radiation over a wavelength range in the electromagnetic spectrum which extends from within the ultraviolet region to within the infrared region thereof, said extension being folded around the hinge end of said film assembly and encasing said strip and holding the elongated portion of said strip which provides said leader means in said folded condition, securing means for holding said extension in said folded condition around said hinge means, the folded and retained portions of said extension, together with said second liquid-confining layer, providing means for closing said envelope at the second end thereof to the access of said radiation, and said envelope extension being provided with a portion which extends in a direction transversely of said envelope and which is severable from the extension portion, said severable portion providing means for opening said envelope to permit withdrawal of said envelope from said film assembly.

3. A photosensitive film assembly as defined in claim 1 wherein the photosensitive portion of said first liquid-confining layer comprises silver halide.

4. A photosensitive film assembly as defined in claim 1 wherein said photosensitive portion of said first liquid-confining layer comprises silver halide and said processing material includes a silver halide developer and a silver halide fixer and wherein said second liquid-confining layer includes a print-carrying area for receiving by transfer a reverse print of a latent image formed in said photosensitive portion upon the exposure of said first liquid-confining layer to actinic radiation.

5. A photosensitive film assembly as defined in claim 1 wherein said two liquid-confining layers are hinged together at one end by hinge means comprising a strip of flexible material secured to each said liquid-confining layer and wherein said container is located adjacent said hinge means and is adapted to seatably contact said first envelope wall member.

6. A photosensitive film assembly as defined in claim 1 wherein said two liquid-confining layers are hinged together at one end by hinge means comprising a strip of flexible material secured to each said liquid-confining layer and wherein said container is located adjacent said hinge means and a second hinge is provided for hingedly connecting said container to said first-mentioned hinge means whereby said container is seatable upon the first envelope wall member, said second-mentioned hinge means comprising a strip of flexible material which is secured to said container and to said first strip.

7. A photosensitive film assembly as defined in claim 1 having handling means comprising a tab member fixed to the outer surface of said second liquid-confining layer.

8. In a film assembly as defined in claim 1, means for severing said envelope whereby to permit the removal thereof from said film assembly and comprising an endless string-like member engaged around said envelope extension adjacent the severable portion thereof whereby a part of said string-like member lies exteriorly of said envelope and film assembly and is available for manual engagement for application of a pulling force to said severable portion of said envelope for the severance thereof.

9. A photosensitive film assembly as defined in claim 1 wherein said second liquid-confining layer has a flexible sheet strippably secured to one end thereof and providing a flexible extension of said layer.

10. A photosensitive film assembly as defined in claim 1 wherein an elongated flexible sheet is strippably secured to the innermost surface of said second liquid-confining layer and provides a mask over portions of said second liquid-confining layer, said mask having an aperture which defines a picture area on said image-receiving layer when said mask is superposed thereon and onto which liquid processing composition is applied during photographic processing, said flexible sheet providing said mask being longer than said second liquid-confining layer and being located relative to said second liquid-confining layer to have a portion thereof extend beyond an end of said second liquid-confining layer.

11. A photosensitive film assembly as defined in claim 2 including means for hingedly connecting said container to said hinged portion of said flexible strip whereby said container is seatable upon the first wall member of said envelope, said means for hingedly connecting said container to said strip comprising a second strip of flexible material which is secured to said container and to the first-mentioned strip.

12. In a photosensitive film assembly comprising a first liquid-confining layer, including a photosensitive portion on one face thereof, a second liquid-confining layer positioned in superposed and overlying relation to said first liquid-confining layer, and a rupturable container holding a liquid processing composition located between and extending transversely of said liquid-confining layers in a position for discharge of its liquid content for spreading between and in contact with said layers, said layers being hingedly connected together at one end thereof for pivotal movement toward and away from each other, in combination, a strip of flexible material, said strip having one end thereof secured to one of said layers and being secured to the other of said layers at a position intermediate of the respective ends of said strip, the portion of said strip between the positions of connection thereof to said layers constituting a hinge portion providing means for hingedly connecting said layers together at one end thereof and the remaining portion of said strip being elongated and providing leader means adapted to assist in the processing of said film assembly, means for connecting said container to the hinge portion of said flexible strip and comprising a second strip of flexible material which is secured to said container and to said first strip of flexible material whereby said container is seatable upon said first liquid-confining layer, and a tab member having a base and a finger grip portion hinged to said base and providing manually engageable means for handling said film assembly, said tab member having the base thereof fixed to that face of the second liquid-confining layer which is furthest removed from the first liquid-confining layer and being positioned adjacent the end of said film assembly at which the first-mentioned strip of flexible material is located, said finger grip portion of the tab member being movable toward and away from said second liquid-confining layer and into a position to have the free end of said finger grip portion extend beyond the connected ends of said layers.

13. A photosensitive film assembly comprising two liquid-confining layers which have substantially similar width dimensions and which are positionable in superposed relation to each other, hinge means secured to a first end of each said layer and hingedly connecting said layers together for pivotal movement toward and away from each other, rupturable container means holding a liquid composition and located between said layers adjacent said first end of each said layer and extending transversely with respect to said layers from a position adjacent one side edge of each said layer to a position adjacent the opposite side edge of each said layer, said container means having substantially parallel leading and trailing edge portions and being connected to said hinge means along said leading edge portion for movement toward and away from each said layer and said container means being provided with a discharge mouth along said trailing edge portion in facing relation to the second end of each said layer for discharge of its liquid content for spreading between said layers from adjacent the first ends of said layers toward the second ends thereof, a first one of said liquid-confining layers constituting a photographic element having a photosensitive portion on one surface thereof, said layers being superposed with said photosensitive portion of said first liquid-confining layer located next to the second one of said liquid-confining layers, said photosensitive portion being capable of having an image formed therein upon exposure, said film assembly containing processing material and including a photographic reagent in an amount sufficient to process an image formed in said assembly, said liquid composition, upon rupture of said container means, rendering said processing material effective to process said image, and envelope means for protecting said film assembly from exposure by radiation over a wavelength range in the electromagnetic spectrum which extends from within the ultraviolet region to within the infrared region of said spectrum and comprising a first wall member and a second wall member located in overlying relation and secured together along the marginal edges thereof except at a first end of said wall members whereby said envelope means is provided with an opening giving access to the interior thereof, said first liquid-confining layer of said film assembly being slidable in said envelope means and being releasably encased therein so that said first ends of said liquid-confining layers and also said container of said film assembly are positioned adjacent the open end of said envelope means with said first wall member of said envelope means being located between said first liquid-confining layer and said container and with said container and said second liquid-confining layer overlying the outer surface of said first wall member, said hinge means extending around said first wall member at said open end of said envelope means and locating said container and said second liquid-confining layer in bearing with the outer surface of the first wall member of said envelope means, the second wall member of said envelope means having a portion, opaque to said radiation, which extends said second wall member beyond said open end of said envelope means and which is folded around said first wall member of said envelope means as well as said hinge means of said film assembly and has a portion overlying said container and the first end of said second liquid-confining layer, adhesive means securing said extension of said second wall member in said folded condition, said extension of said envelope means and the portion thereof which overlies said second liquid-confining layer of said film assembly together with said second liquid-confining layer, said hinge means and said container providing means for closing the open end of said envelope means to the access of said radiation, and said extension of said envelope means being provided with a portion extending transversely of said envelope means from side to side thereof which is severable from said extension portion, said severable portion of said extension portion providing means for opening said envelope means to withdraw said envelope means from said film assembly.

14. A photosensitive film assembly as defined in claim 13 wherein said photosensitive portion of said first liquid-confining layer comprises silver halide and said processing material includes a silver halide developer and a silver halide fixer and wherein said second liquid-confining layer includes a print-carrying area for receiving by transfer a reverse print of a latent image formed in said photosensitive portion upon the exposure of said first liquid-confining layer to actinic radiation.

15. A photosensitive film assembly as defined in claim 13 wherein said second liquid-confining layer has a flexible sheet strippably secured to one end thereof and providing a flexible extension of said layer.

16. A photosensitive film assembly as defined in claim 13 wherein an elongated flexible sheet is strippably secured to the innermost surface of said second liquid-confining layer and provides a mask over portions of said second liquid-confining layer, said mask having an aperture which defines a picture area on said image-receiving layer when said mask is superposed thereon and onto which liquid processing composition is applied during photographic processing, said flexible sheet providing said mask being longer than said second liquid-confining layer and being located relative to said second liquid-confining layer to have a portion thereof extend beyond an end of said second liquid-confining layer.

17. A photosensitive cut film assembly comprising a first liquid-confining layer, a second liquid-confining layer positionable in superposed relation to the first liquid-confining layer, said first- and second-mentioned liquid-confining layers being of similar shape and having similar transverse dimensions, hinge means secured to a first end of each said layer and hingedly connecting said layers together for pivotal movement toward and away from each other, a rupturable container holding a liquid composition, said container being mounted between and extending transversely of said liquid-confining layers at a position adjacent said first end of said layers for discharge of its liquid content upon rupture of said container between said layers and toward that end of each said layer which is opposite to said first end and which provides a second end thereof, said first liquid-confining layer constituting a photographic element having a photosensitive portion on one surface thereof and said second liquid-confining layer constituting a flexible image-receiving sheet support formed of image-receptive material for receiving a photographic transfer image, said layers being superposed with said photosensitive portion of said first layer facing said second layer and said layers being positioned so that the second end of said second layer overlies said first liquid-confining layer between the end of said first layer at a position near the second end of said first layer, said photosensitive portion being capable of having an image formed therein upon exposure to radiation within the visible and near visible region of the spectrum and said photosensitive portion overlying an area on that surface of said second liquid-confining layer which faces said photosensitive portion and which extends from adjacent said container toward the second end of the second liquid-confining layer and provides an area for receiving said transfer image, said film assembly containing processing material and including a photographic reagent in an amount sufficient to process an image formed in said assembly, said liquid composition, upon rupture of said container, rendering said processing material effective to process said image and being in a quantity in excess of that needed to cover the image-receiving area on said second liquid-confining layer and the part of said photosensitive portion of the first liquid-confining layer which overlies said image-receiving area, and means for collecting said excess liquid upon the rupture of said container and the spreading of said liquid between said layers, said means for collecting said excess liquid comprising a flexible sheet member having a portion superposed on and secured to that surface of said second liquid-confining layer which faces said first liquid-confining layer and also having a portion which extends freely beyond said second end of said second liquid-confining layer to a location where the free end of the extension portion of said sheet member overlies the second end of said first liquid-confining layer, the portion of said sheet member in contact with said second liquid-confining layer being provided with means extending transversely of said second layer being provided with means extending transversely of said second layer at a position near the second end of said second layer for defining that end of said image-receiving area on second liquid-confining layer which is located the farthest from said container.

18. A photosensitive film assembly as defined in claim 17 wherein the portion of said sheet member is contact with said second liquid-confining layer extends transversely of said layer and substantially from end to end thereof and is provided with an aperture which defines said image-receiving area on said second liquid-confining layer.

19. A photosensitive film assembly as defined in claim 18 wherein the portion of said sheet member which extends freely beyond said second end of said second liquid-confining layer has means thereon which increase the thickness of at least one part of the extension portion over the remainder of the extension portion and comprising at least one relatively small and solid member formed of a material which is difficulty compressible under pressure applied to said layers to effect the rupture of said container during the photographic processing of said film assembly, said solid member being fixed to said extension portion at a position located between the second end of said second liquid-confining layer and the end of the extension portion which is most distant therefrom and occupying an area on said extension portion which is considerably smaller than the area of the aperture in said sheet member.

(References on following page)

References Cited in the file of this patent

UNITED STATES PATENTS

| | | | |
|---|---|---|---|
| 253,354 | Eastman | Feb. 7, | 1882 |
| 563,915 | Eastman | July 14, | 1896 |
| 997,763 | Doyle | July 11, | 1911 |
| 1,172,072 | Stott | Feb. 15, | 1916 |
| 1,467,108 | Hodgson | Sept. 4, | 1923 |
| 1,550,750 | Shannon | Aug. 25, | 1925 |
| 1,748,490 | Martin | Feb. 25, | 1930 |
| 1,767,972 | Garretson | June 24, | 1930 |
| 1,794,382 | Josepho | Mar. 3, | 1931 |
| 1,840,908 | Lozier et al. | Jan. 12, | 1932 |
| 1,950,863 | Raguin | Mar. 13, | 1934 |
| 2,359,659 | Margulies | Oct. 3, | 1944 |
| 2,543,181 | Land | Feb. 27, | 1951 |
| 2,563,387 | McCune | Aug. 7, | 1951 |
| 2,565,377 | Land | Aug. 21, | 1951 |
| 2,612,450 | Land | Sept. 30, | 1952 |
| 2,612,451 | Land | Sept. 30, | 1952 |
| 2,612,452 | McCune | Sept. 30, | 1952 |
| 2,627,459 | Land | Feb. 3, | 1953 |
| 2,627,460 | Land | Feb. 3, | 1953 |
| 2,659,673 | Rogers et al. | Nov. 17, | 1953 |

FOREIGN PATENTS

| | | | |
|---|---|---|---|
| 941,429 | France | Jan. 11, | 1949 |